Sept. 19, 1944.   H. VOLIS ET AL   2,358,749
ADJUSTABLE PLUG GAUGE
Filed Aug. 17, 1942
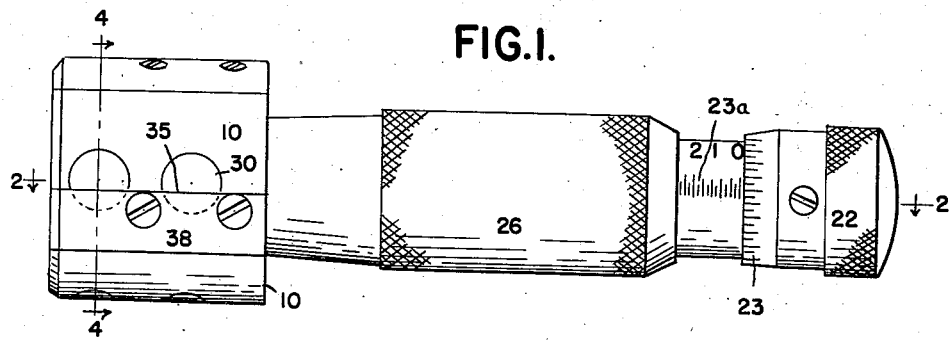
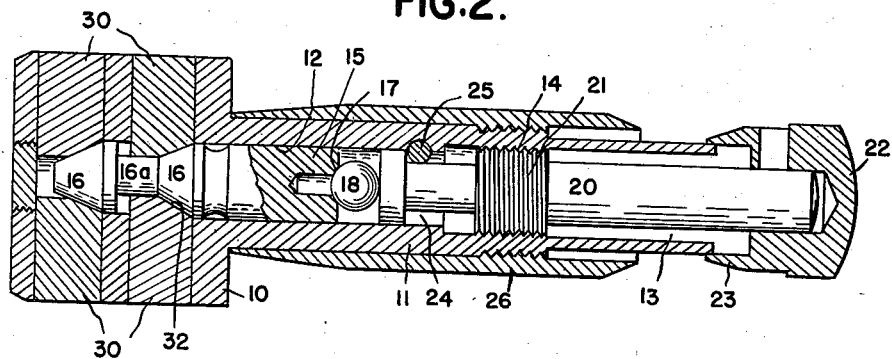
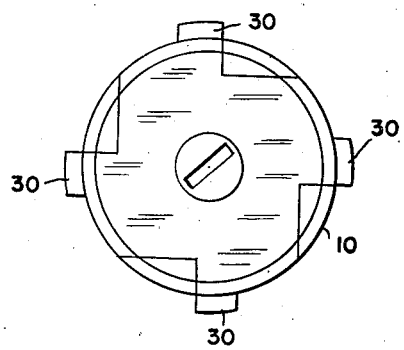
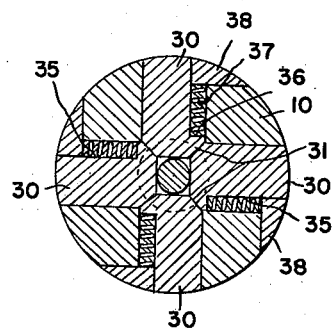
INVENTORS
HARRY VOLIS
KERR VOLIS
BY
Swan, Frye, & Hardesty
ATTORNEYS Patented Sept. 19, 1944

2,358,749

UNITED STATES PATENT OFFICE 2,358,749

ADJUSTABLE PLUG GAUGE

Harry Volis and Kerr Volis, Detroit, Mich.

Application August 17, 1942, Serial No. 455,056

1 Claim. (Cl. 33—178)

The present invention relates to gauges for making accurate measurement of the dimensions of openings of cylindrical or other shape, though more especially designed for use with bored or drilled holes.

Among the objects of the invention is a plug gauge having a micrometer adjustment.

Another object is a gauge of the kind indicated which will have a wider range of adjustment than those heretofore known.

Other objects will readily occur to those skilled in the art upon reference to the following description and the accompanying drawing in which Figure 1 is a view in elevation of a gauge embodying the invention.

Figure 2 is a central longitudinal section thereof.

Figure 3 is an end view of the gauge with parts extended; and

Figure 4 is a section on line 4—4 of Figure 1.

In the drawing, the gauge is indicated as comprising an accurately cylindrical body 10 having four diametrical holes therethrough, two of which are parallel while the other two are likewise parallel but intersect the first two at right angles, thus providing eight radially arranged passages.

One end of the cylindrical body 10 is provided with a concentric extension 11 and both the extension and body are bored axially, as at 12, the bore being counterbored as at 13 and threaded for a short distance as indicated at 14.

Mounted in the bore 12 is a shaft 15 extending from near the end of body 10 to a short distance within extension 11 and provided at that end within the body 10 with the spaced cones 16 having similar angles of slope and spaced apart a distance equal to the space between the parallel diametrical holes above mentioned.

The rear end of shaft 15 is provided with a seat 17 for a steel ball 18 serving as an antifriction bearing between shaft 15 and the end of shaft 20.

This shaft 20 is threaded, as at 21, intermediate its ends, to cooperate with the threaded portion 14 of body extension 11, so that rotation moves the shaft 20 longitudinally and, when the shaft is in contact with ball 18, likewise moves longitudinally the shaft 15.

The outer end of shaft 20 is preferably fixed in a knurled cap 22 carrying graduations 23 by means of which the degree of rotation may be noted. Further, the cap 22 preferably is of such size that its skirt 23 overlies the end of the stationary body extension 11 which likewise carries graduations, indicated at 23a. These two sets of graduations 23 and 23a are preferably conventional.

Further, in order to limit the longitudinal movement of shaft 20 it is provided with a peripheral channel 24 in which lies a transverse pin 25, the ends of which as well as the greater part of body extension 11 being covered by an outer sleeve 26.

Accurately fitted in the diametrical holes in body 18 are eight preferably identical pins 30, bevelled at their inner ends at diametrically opposite points as at 31 to permit sufficient inward movement to allow one set of the pins to contact the part 16a of shaft 15 and the other set a like movement.

In addition to the bevelling mentioned, each pin 30 is bevelled or provided with a sloping surface 32 having the same angularity as the cones 16 and arranged to coact therewith to cause outward radial movement of the pins when the shaft 20 is rotated in the threads 14 to move it, and thereby shaft 15, toward the body 10.

In order to provide for the inward movement of pins 30 when the shaft 20 is retracted, each pin is flattened on one side for the greater portion of its length as indicated at 35, leaving a shoulder 36 against which acts a spring 37, abutting at its other end against a plate or retainer strip 38, which also, lying against the flat sides of pins 30, prevents the pins from rotating.

It is, of course, to be understood that the outer ends of the pins 30, the plates 38 and body 10, are accurately finished to present a smooth cylindrical surface when the pins are fully retracted.

Now having described the preferred form of embodiment of the invention, what is claimed is:

In an adjustable plug gauge, a radially movable plug having one side cut away for a portion of its length whereby to present a flat lateral surface and likewise a shoulder, a plate fixed against said flat side of said plug and thereby preventing plug rotation and a spring under compression arranged between said plate and said shoulder.

HARRY VOLIS.
KERR VOLIS.